United States Patent [19]

Bruhn et al.

[11] Patent Number: 5,133,221
[45] Date of Patent: Jul. 28, 1992

[54] PENDULUM GEAR, ESPECIALLY FOR WINDSHIELD WIPERS OF MOTOR VEHICLES

[75] Inventors: Rainer Bruhn, Karlsruhe; Robert Klinar, Bietigheim-Bissingen, both of Fed. Rep. of Germany

[73] Assignee: SWF Auto-Electric GmbH, Bietigheim-Bissingen, Fed. Rep. of Germany

[21] Appl. No.: 646,592

[22] PCT Filed: May 21, 1990

[86] PCT No.: PCT/EP90/00814

§ 371 Date: Jan. 23, 1991

§ 102(e) Date: Jan. 23, 1991

[87] PCT Pub. No.: WO90/14254

PCT Pub. Date: Nov. 29, 1990

[30] Foreign Application Priority Data

May 24, 1989 [DE] Fed. Rep. of Germany ....... 3916945

[51] Int. Cl.⁵ .................... F16H 21/18; F16H 55/18
[52] U.S. Cl. ............................ 74/25; 74/32; 74/42; 74/409; 74/440; 15/250.3
[58] Field of Search ............... 74/32, 42, 25, 409, 74/440; 15/250.3

[56] References Cited

U.S. PATENT DOCUMENTS

| | | | |
|---|---|---|---|
| 2,771,782 | 11/1956 | Darby | 74/32 |
| 3,689,955 | 9/1972 | Winkelmann | 15/250.30 |
| 3,754,298 | 8/1973 | Menil | 15/250.30 |
| 3,796,104 | 3/1974 | Templeton | 74/42 |
| 3,899,933 | 8/1975 | Wright et al. | 74/440 |
| 4,011,764 | 3/1977 | Buck et al. | 74/32 X |
| 4,137,782 | 2/1979 | Lange | 74/32 |
| 4,747,321 | 5/1988 | Hannel | 74/440 |
| 4,912,998 | 4/1990 | Sugano et al. | 74/409 |

FOREIGN PATENT DOCUMENTS 2641351  7/1990  France .................. 74/440

*Primary Examiner*—Rodney H. Bonck
*Assistant Examiner*—Daniel Wittels
*Attorney, Agent, or Firm*—Robert P. Seitter; J. Gordon Lewis

[57] ABSTRACT

Pendulum gears for windshield wipers of motor vehicles are known, which pendulum gears comprise a first gear member provided with teeth, which gear member is non-rotatably seated on a driven shaft, and a second gear member provided with teeth, which gear member meshes with the first gear member, and by which the first gear member can be driven in pendulum motion between two reversing positions. The noises occurring in the reversing positions of the first gear member are to be reduced. For this purpose the tooth play between the teeth of the two gear members is decreased towards the reversing position of the first gear member. Thus a beating noise caused by the teeth when changing the tooth flanks is avoided.

23 Claims, 3 Drawing Sheets

PENDULUM GEAR, ESPECIALLY FOR WINDSHIELD WIPERS OF MOTOR VEHICLES

INTRODUCTION

The invention relates to a pendulum gear which is especially used for driving windshield wipers of motor vehicles.

BACKGROUND OF THE INVENTION

Such gears, which are usually located in a gear housing and, together with an electric motor onto which the gear housing is mounted, form a drive unit, the driven shaft of which drive unit extending the gear housing can be moved in pendulum motion, are used for driving windshield wipers in big numbers of pieces in the automobile industry. Such a pendulum gear is known, for instance from the DE-PS 32 37 269. In this known pendulum gear as a first gear member a tooth segment is fixed in a way that is protected against twisting onto a driven shaft which can simultaneously also be called wiper shaft because a wiper arm is directly mounted onto it. This tooth segment meshes with a second gear member which as a tooth segment is integrally formed with a push rod which at its one end is rotatably connected with a crank pin and at its other end is rotatably connected with a crank rocker which is rotatably mounted onto the driven shaft and ensures that the two tooth segments engage into each other. Thereby the axis of the link between the push rod and the crank rocker is identical with the axis of the tooth segment on the push rod.

Since motor vehicles making little noise are demanded more and more by the passengers inside as well as other road-users outside the cars, in the known pendulum gear the noises are considered to be disturbing, which especially occur in the reversing points of the gear, that is then, when the driven shaft reverses its direction of rotation.

BRIEF DESCRIPTION OF THE INVENTION

Therefore the object of the invention is to develop a pendulum gear in such a way that the noises are reduced when the shaft driven in pendulum motion reverses its direction of rotation.

This object is achieved according to the invention by the fact that in the pendulum gear the tooth play between the teeth of the two gear members decreases at least towards one reversing position. Thus first of all the invention is based on the knowledge that the noises in the known pendulum gear go back to the fact that, when reversing the direction of rotation, the teeth of the two gear members meshing with each other change the tooth flanks, on which they lie, and thereby due to the tooth play make a beating noise. However, a certain tooth play is desired for not wearing out the teeth of the gear members nor reducing the effectivity of the motor too much. According to the invention the tooth play between the teeth of the gear members decreases towards the reversing positions of said gear members. Thus wear is only slightly increased and the effectivity of the motor is not reduced because in the reversing positions of the gear members only a minimum torque is required. Simultaneously it is achieved that the teeth of the gear members engaging into each other near the reversing positions lie on both tooth flanks of a tooth gap so that no reversing noise can occur any longer.

The noise is already reduced to a certain extent by the fact that the tooth play between the teeth of the two gear members only decreases towards one reversing position. Of course, the tooth play, whenever it is possible, is to be decreased towards both reversing positions.

Advantageous developments of a pendulum gear according to the invention can be gathered from the subclaims.

So in a first preferred embodiment the tooth play between the teeth of the two gear members is decreased by the fact that towards one reversing position the teeth engage into the tooth gaps between the teeth more deeply. This can advantageously be achieved by displacing the center of a reference circle, which the teeth of a gear member have, with respect to the axis of rotation of the gear member in such a way that the distance between the reference circle and the axis of rotation increases towards the teeth, by way of which in a reversing position the gear member engages into the teeth of the other gear member. In such an embodiment the advantageous arrangement of the teeth of a gear member on a circle is maintained. In order to have the same conditions in both reversing positions, the distance between the reference circle of the teeth and the axis of rotation of the gear member increases from a tooth in the middle towards the teeth, by way of which in a reversing position each the gear member engages into the teeth of the other gear member.

In a second preferred embodiment the tooth play between the teeth of the two gear members is reduced by the fact that towards the teeth, by way of which in a reversing position one gear member engages into the teeth of the other gear member, the width of the teeth increases or the width of the gaps between the teeth decreases.

For not increasing the tooth pressure between the teeth of the two gear members too much, it is of an advantage, if the teeth of a gear member are radially elastically and yieldingly formed towards an area of engagement in a reversing position. This can be realized by locating the teeth of a gear member on a cantilever arm.

Advantageously a tooth crown, the center of the reference circle of which is displaced with respect to the axis of rotation of the gear member comprising said tooth crown, and/or teeth and/or tooth gaps of different width are located on the first gear member, that is, on the gear member which is fixed onto the shaft driven in pendulum motion in a way that is protected against twisting.

BRIEF DESCRIPTION OF THE DRAWINGS

Several embodiments of a pendulum gear according to the invention are illustrated in the drawings. The invention is described more in detail by way of the figures of these drawings, in which.

DETAILED DESCRIPTION OF THE PREFERRED AND ALTERNATIVE EMBODIMENT

Figure 1:
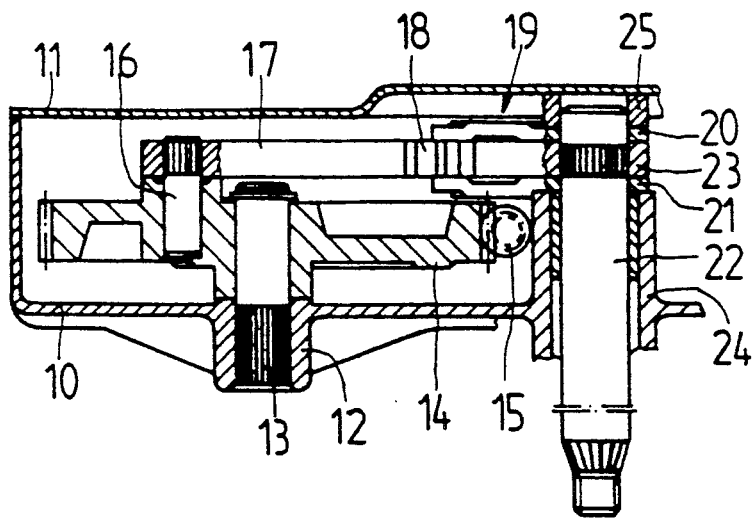
FIG. 1, is a partial section of a pendulum gear principally constructed in a conventional manner and comprising a tooth play between two gear members, which tooth play decreases towards the reversing positions of the driven shaft.
Figure 2:
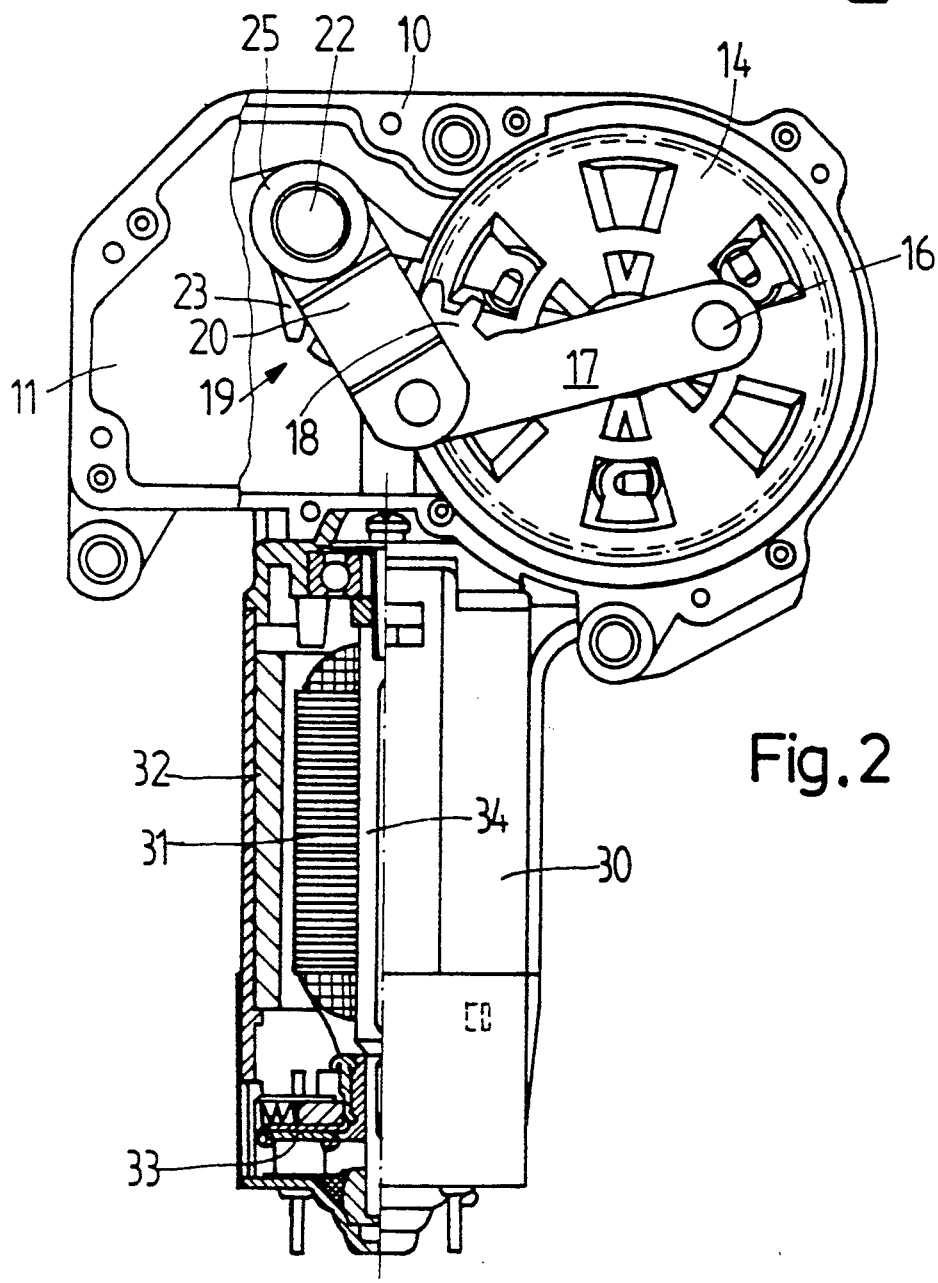
FIG. 2, in axial direction of the driven shaft is a view into the open gear housing including the pendulum gear according to the invention located therein.

In the drive unit shown in the FIGS. 1 and 2 for a windshield wiper of a motor vehicle there is a pendulum gear in a pot-like gear housing 10 which is closed by a lid 11 and is flanged onto a motor housing 30, in which there are a rotor 31, permanent magnets 32 and a bearing bush plate 33.

A stay rod 13 is pressed into a bearing eye 12 of the gear housing 10, onto which stay rod 13 a worm wheel 14 is rotatably mounted, which worm wheel 14 is driven in a known way by a worm 15 which is part of the rotor shaft 34 of the electric motor. A pin 16 is eccentrically and rotatably mounted onto the worm wheel 14, onto which pin 16 a push rod 17 is fixed. The section of the pin 16 extending the worm wheel 14 can be regarded as a crank pin of a crank, the length of which corresponds to the distance between the axis of the pin 16 and the axis of the stay rod 13. At its end far from the pin 16 the push rod 17 is formed as a tooth segment 18 and with respect to this tooth segment is centrically swivellably mounted onto a rocker generally designated by 19. The rocker consists of two levers 20 and 21 held at a distance of each other, which levers 20 and 21 are rotatably mounted onto a driven shaft 22 on both sides of a pinion 23 non-rotatably seated on driven shaft 22 and also enclose the tooth segment 18 on the push rod 17. The tooth segment 18 and the pinion 23, which can be either a complete tooth wheel or, as in the illustrated embodiment, can also only be a tooth segment, are kept engaged into each other by means of the rocker 19. The lever 21, on its side turning away from the tooth segment 23, lies on a bearing eye 24 for the driven shaft 22, which bearing eye 24 is integrally formed onto the housing 10 and projects into the inside of the housing. The lever 20, on its side turning away from the pinion 23, is supported on the lid 11 via a ring 25. Thus, in the area of the driven shaft 22 the levers 20 and 21 a re axially supported on both sides and therefore cannot be tilted.

During operation the worm wheel 14 rotates and drives the push rod 17 in pendulum motion via the pin 16. The pendulum motion of the push rod 17 is transferred to the driven shaft 22 via the tooth segment 18 and the tooth segment 23, onto which driven shaft 22 the arm of a wiper arm-and-blade assembly can be fixed in a known way.

Figure 4:
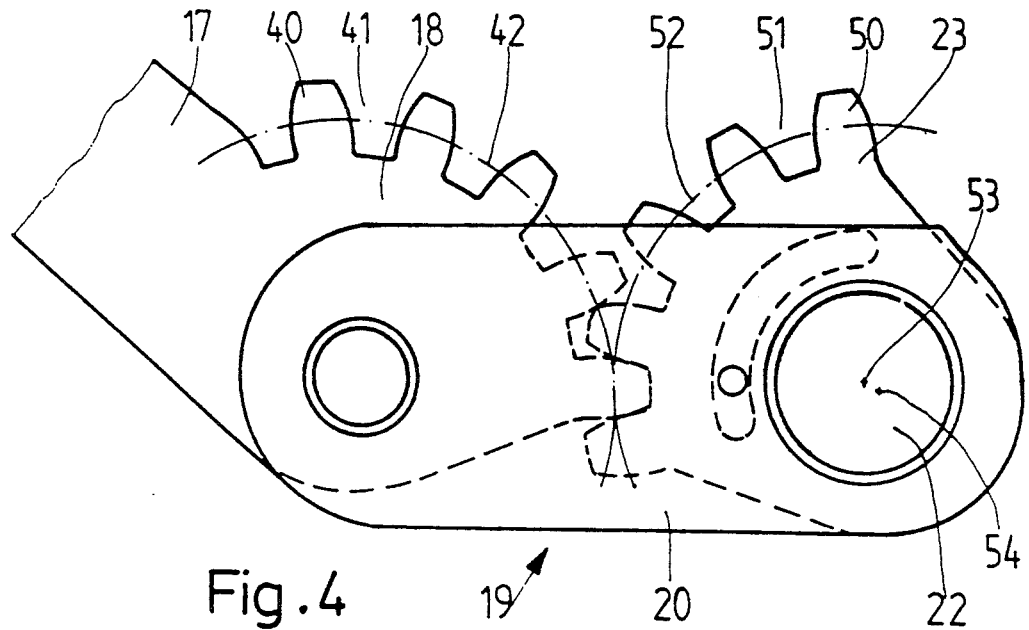
FIG. 4, is a view of the two gear members similar to that of FIG. 3, however in a reversing position.
Figure 3:
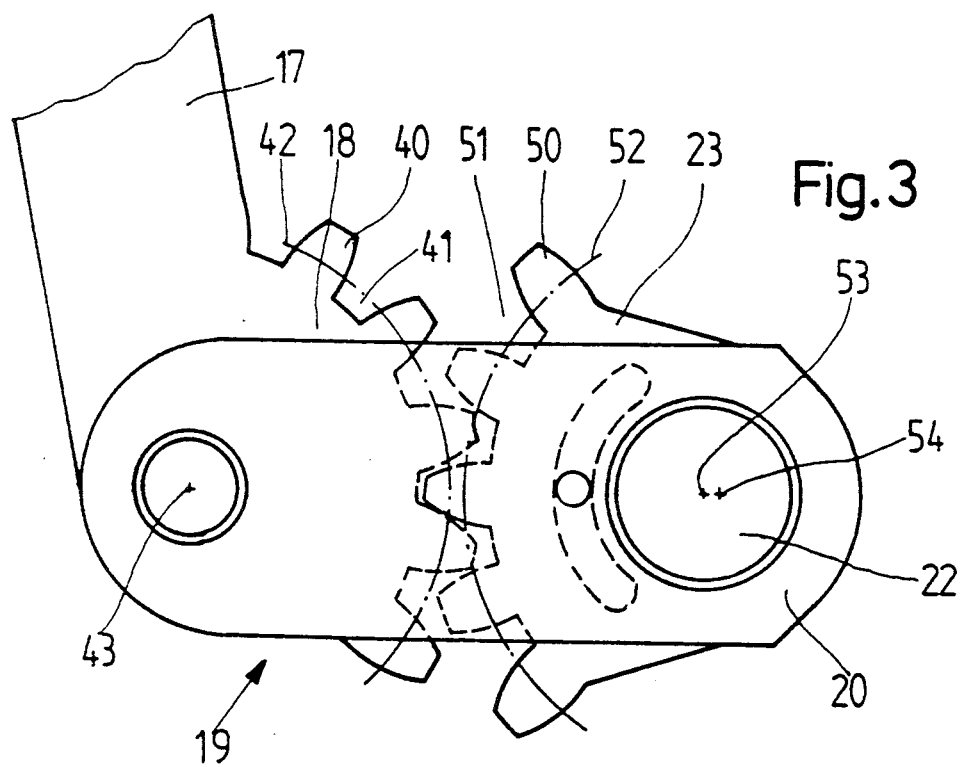
FIG. 3, is an enlarged view of the two gear members, between which the tooth play is decreased towards the reversing positions, in a central position between the two reversing positions.

In the FIGS. 3 and 4 the two tooth segments 18 and 23 as well as their arrangement in the gear are illustrated more precisely. The tooth crown of the tooth segment 18 with the teeth 40 and the tooth gaps 41 between the teeth can be seen. The reference circle 42 of the teeth 40 indicated in broken lines has, as already mentioned beforehand, a center which is positioned on the articulation axis 43 between the push rod 17 and the rocker 19.

Thus the axis of the tooth crown of the tooth segment 18 consisting of the teeth 40 and the tooth gaps 41 is identical with the axis of rotation of the tooth segment 18.

The teeth 50 and the tooth gaps 51 of the tooth segment 23, too, lie on a reference circle, which is designated by the reference numeral 52. However, the center 54 of this reference circle does not lie on the axis of rotation 53 of the driven shaft 22, which is also the axis of rotation of the tooth segment 23, but is displaced with respect to this axis of rotation 53, that is, it can be seen in the FIGS. 3 and 4 that the center 54 of the reference circle 52 and thus the axis of the tooth crown of the tooth segment 23 consisting of the teeth 50 and the tooth gaps 51 is selected in such a way that the tooth in the middle of the five teeth 50 of the tooth segment 23 is situated in the plane formed by the axis 53 and the center 54, that thus in the area of the tooth in the middle the distance between the reference circle 52 and the axis of rotation 53 is the smallest and that this distance increases towards the two ultimate teeth 50. Consequently, starting off from a central area of engagement on the tooth segment, the teeth of the two tooth segments engage more and more deeply into the tooth gaps of the tooth segment each towards the outer teeth of the tooth segment 23. Comparing FIG. 3 with FIG. 4 makes clear that thus the play between the teeth of the two tooth segments is more or less reduced to zero in the reversing positions of the tooth segment 23 and that thus reversing noises are avoided in the reversing positions. For this purpose in the illustrated embodiment a distance of 0.2 mm between the center 54 of the reference circle 52 and the axis of rotation 53 is sufficient.

Figure 5:
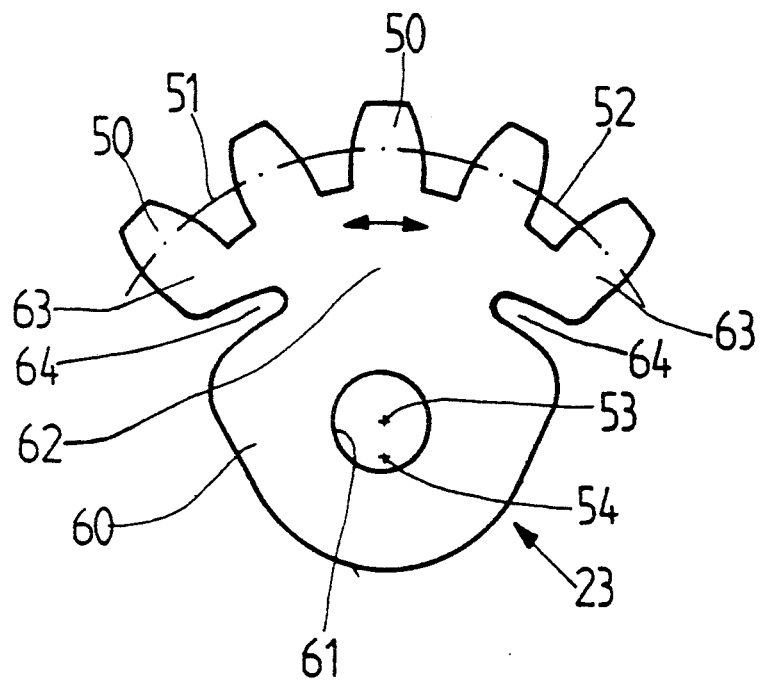
FIG. 5, is another embodiment of a gear member, in which as in the embodiment according to the FIGS. 1 to 4 the centre of the reference circle of the tooth crown is displaced with respect to the axis of rotation of the gear member and in which teeth are elastically yieldingly formed.

In FIG. 5 another tooth segment is shown which can be used instead of the tooth segment 23 of the embodiment according to the FIGS. 1 to 4. This tooth segment 23 of FIG. 5 has a basis 60 with a bore 61 by way of which it can be fixed onto a shaft. A web 62 starts off from the basis radially, which web 62 carries two arms 63 unsupportedly extending—separated from the basis 60 by a gap 64—into opposite circumferential directions. Radially at the outside the arms 63 are provided with five teeth 50 and tooth gaps 51 in between. The tooth 50 in the middle is radially situated just outside the web 62.

The axis 53 of the bore 61 corresponds to the axis of rotation of the tooth segment 23. With respect to this axis of rotation the center 54 of the reference circle 52 is displaced in the same way as in the embodiment according to FIGS. 1 to 4 so that, starting off from the tooth 50 in the middle towards the outer teeth, the distance between the reference circle 52 and the axis 53 increases again. Due to the gap 64 the arms 23 are slightly elastic so that they can yield to a tooth pressure exerted by the teeth, for instance exerted by the teeth of the tooth segment 18 of the FIGS. 1 to 4 onto the tooth segment 23 according to FIG. 5. Thus it is certainly avoided that the pressure gets too big between the tooth flanks of the teeth of the two tooth segments.

Figure 6:
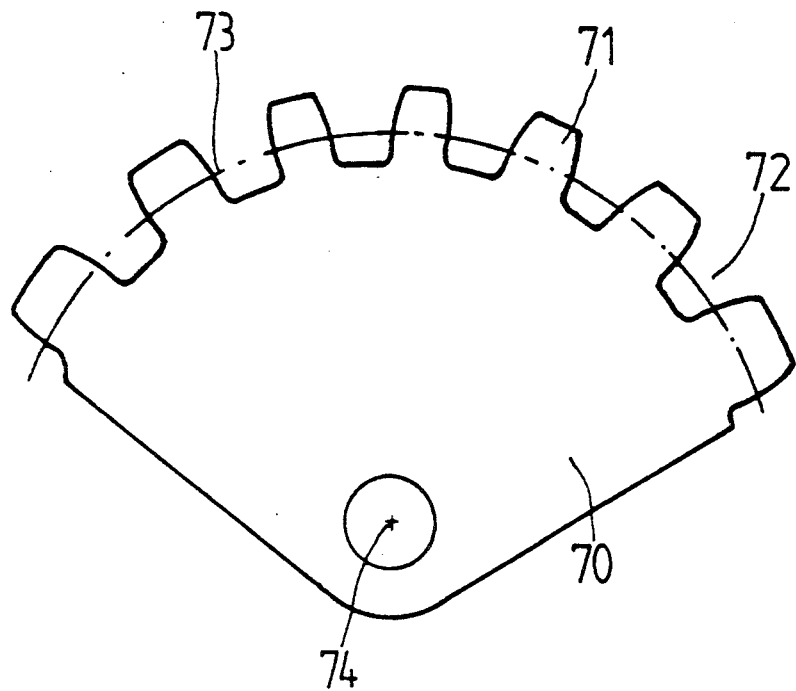
FIG. 6, is a tooth segment in which the tooth width increases from a tooth in the middle towards the lateral teeth.

The tooth segment 70 of FIG. 6, which for instance can be used in a pendulum gear instead of a tooth segment 23, comprises a total of seven teeth 71 and gaps 72 in between. The center 74 of the reference circle 73 of the teeth 71, different from the two embodiments described beforehand, is positioned on the axis of rotation of the tooth segment 70. For, starting off from the tooth 71 in the middle of the tooth segment 70, reducing the tooth play between the teeth 71 and the teeth of another bear member towards the two reversing positions of the tooth segment 70, the width of the teeth continually increases from the tooth 71 in the middle towards the two ultimate teeth 71, whereas the tooth gaps 71 decrease correspondingly so that the pitch of the tooth segment is the same everywhere. So, the more the tooth segment 70 approaches a reversing position, the more the tooth gaps of the second gear member are filled by the teeth 71 of the tooth segment 70 and the play becomes smaller, until, after all, no play is left when the reversing position is reached. Thus noises in the reversing positions of the tooth segment 70, too, are avoided.

Finally, it should be noted that the tooth play can already be reduced by only decreasing the width of the tooth gaps or by only increasing the width of the teeth. However, an embodiment is preferred, in which the pitch is the same.

What is claimed is:

1. A pendulum gear, especially for windshield wipers of motor vehicles, comprising:
   a first gear member having first teeth and the first gear member fixedly connected on a driven shaft for rotation therewith; and
   a second gear member having second teeth meshingly engaging the first teeth of the first gear member for driving the first gear member in pendulum motion between two revering positions, wherein tooth play between the first and second teeth of the first and second gear members decreases at least towards one reversing position of the first gear member.

2. A pendulum gear according to claim 1, wherein towards one reversing position the first and second teeth of the first and second gear members engage more deeply into tooth gaps between the first and second teeth.

3. A pendulum gear according to claim 2, wherein a center of a reference circle for the teeth of one gear member is displaced with respect to an axis of rotation of the one gear member in such a way that a distance between the axis of rotation and the teeth increases in a reversing position so that the one gear member engages deeper into the teeth of the other gear member.

4. A pendulum gear according to claim 3, wherein the distance between the reference circle of the teeth and the axis of rotation of the one gear member increases from a tooth in a middle position towards the teeth in each reversing position so that the one gear member engages deeper into the teeth of the other gear member.

5. A pendulum gear according to claim 3, wherein the displacement between the center of the reference circle and the axis of rotation is 0.2 mm.

6. A pendulum gear according to claim 3, wherein tooth crowns of different width are located on the first gear member.

7. A pendulum gear according to claim 3, wherein the teeth of different width are located on the first gear member.

8. A pendulum gear according to claim 3, wherein the teeth gaps of different width are located on the first gear member.

9. A pendulum gear according to claim 1, wherein a width of the teeth of one gear member increases as a position of the teeth approach a reversing position and a width of gaps between the teeth decreases.

10. A pendulum gear according to claim 1, wherein a width of the teeth of one gear member increases as a position of the teeth approach a reversing position.

11. A pendulum gear according to claim 1, wherein a width of gaps between the teeth of one gear member decreases as a position of the teeth approach a reversing position.

12. A pendulum gear according to claim 1, wherein the teeth of one gear member are radially, elastically and yieldingly formed towards an area of engagement in a reversing position.

13. A pendulum gear according to claim 12, wherein the teeth of one gear member are located on a cantilever arm.

14. A pendulum gear according to claim 13, wherein the one gear member has a base with an outwardly extending web, and wherein cantilever arms provided with teeth are formed onto the web extending into opposite directions.

15. A pendulum gear comprising:
    a first gear member defining a plurality of circumferentially spaced teeth carried for rotation about a first axis;
    a second gear member defining a plurality of circumferentially spaced teeth carried for rotation about a second axis disposed parallel to and a fixed distance from said first axis, whereby said second gear member teeth continuously intermesh with said first gear member teeth and generally exhibit an amount of tooth play between said teeth;
    means operative to reciprocally drive said first gear member between two end limits of travel; and
    means operative to vary the amount of tooth play between said gear members from a minimal value at one of said end limits of travel to a maximum value at a midpoint of travel.

16. A pendulum gear according to claim 15, wherein said tooth play varying means comprises a varying characteristic circumferential tooth interspacing of at least one of said gear members.

17. A pendulum gear according to claim 15, wherein a central tooth of one of said gear members is relatively rigidly carried thereby and an outer tooth is relatively resiliently carried thereby.

18. A pendulum gear according to claim 15, wherein said tooth play varying means comprises a varying characteristic circumferential tooth width of at least one of said gear members.

19. A pendulum gear according to claim 15, wherein said tooth play varying means comprises an eccentric offset of a characteristic tooth reference circle of at least one of said gear members from an axis of rotation of that gear member.

20. A pendulum gear according to claim 15, wherein the amount of tooth play between said gear members approaches zero value at said end limits of travel.

21. A pendulum gear according to claim 15, wherein said tooth play varying means is operative to establish a minimal value at both said end limits of travel.

22. A motor vehicle windshield wiper drive mechanism comprising:
    a drive motor;
    a wiper blade assembly; and
    a pendulum gear drivingly interconnecting said motor and wiper blade assembly, said pendulum gear including:
    a first gear member defining a plurality of circumferentially spaced teeth carried for rotation with a wiper blade assembly engaging shaft about a first axis;

a second gear member defining a plurality of circumferentially spaced teeth carried for rotation with a motor driven shaft about a second axis disposed parallel to and a fixed distance from said first axis, whereby said second gear member teeth continuously intermesh with said first gear member teeth and generally exhibit an amount of tooth play between said teeth;

means operative to reciprocally drive said first gear between two end limits of travel; and means operative to vary the amount of tooth play between said gear members from a minimal value at one end of said end limits of travel to a maximum value at a midpoint of travel.

23. In a windshield wiper drive mechanism having a drive motor, a wiper blade assembly and pendulum gear means for drivingly interconnecting said drive motor and wiper blade assembly, the improvement wherein said pendulum gear means comprises:

a first gear member having first teeth and the first gear member fixedly connected on a driven shaft for rotation therewith;

a second gear member having second teeth meshingly engaging the first teeth of the first gear member for driving the first gear member in pendulum motion between two reversing positions, wherein tooth play between the first and second teeth of the first and second gear members decreases at least towards one reversing position of the first gear member; and the teeth of one gear member having a center of a reference circle displaced with respect to an axis of rotation of the one gear member in such a way that a distance between the axis of rotation and the teeth increases in at least one reversing position so that the one gear member engages deeper into the teeth of the other gear member, the displacement between the center of the reference circle and the axis of rotation being approximately 0.2 mm, a width of the teeth of one gear member increasing as a position of the teeth approach a reversing position and a width of gaps between the teeth decreasing as the position of the teeth approach the reversing position, the teeth of one gear member radially, elastically and yieldingly formed toward an area of engagement in each reversing position, the one gear member further having a base with an outwardly extending web and cantilever arms having teeth formed thereon, the cantilever arms connected to the web and extending in two opposite directions.

* * * * *